(12) United States Patent
Farmer

(10) Patent No.: US 12,140,289 B2
(45) Date of Patent: Nov. 12, 2024

(54) SIDE LIGHT LED TROFFER TUBE

(71) Applicant: Bridgelux, Inc., Fremont, CA (US)

(72) Inventor: Todd Farmer, Fremont, CA (US)

(73) Assignee: BRIDGELUX, INC., Fremont, CA (US)

(*) Notice: Subject to any disclaimer, the term of this patent is extended or adjusted under 35 U.S.C. 154(b) by 0 days.

(21) Appl. No.: 18/478,805

(22) Filed: Sep. 29, 2023

(65) Prior Publication Data

US 2024/0102622 A1    Mar. 28, 2024

Related U.S. Application Data

(63) Continuation of application No. 17/527,487, filed on Nov. 16, 2021, now Pat. No. 11,808,433, which is a continuation of application No. 17/194,067, filed on Mar. 5, 2021, now Pat. No. 11,204,141, which is a continuation of application No. 16/926,296, filed on Jul. 10, 2020, now Pat. No. 10,962,184, which is a
(Continued)

(51) Int. Cl.

| | | |
|---|---|---|
| *F21V 3/06* | (2018.01) | |
| *F21K 9/27* | (2016.01) | |
| *F21K 9/66* | (2016.01) | |
| *F21K 9/69* | (2016.01) | |
| *F21S 8/04* | (2006.01) | |
| *F21V 3/02* | (2006.01) | |
| *F21V 3/04* | (2018.01) | |
| *F21V 8/00* | (2006.01) | |
| *F21V 7/00* | (2006.01) | |
| *F21Y 101/00* | (2016.01) | |
| *F21Y 103/30* | (2016.01) | |
| *F21Y 103/33* | (2016.01) | |
| *F21Y 115/10* | (2016.01) | |

(52) U.S. Cl.
CPC ........ *F21S 8/04* (2013.01); *F21K 9/27* (2016.08); *F21K 9/66* (2016.08); *F21K 9/69* (2016.08); *F21V 3/02* (2013.01); *F21V 3/049* (2013.01); *F21V 3/06* (2018.02); *G02B 6/001* (2013.01); *F21V 7/005* (2013.01); *F21Y 2101/00* (2013.01); *F21Y 2103/30* (2016.08); *F21Y 2103/33* (2016.08); *F21Y 2115/10* (2016.08)

(58) Field of Classification Search
CPC ..... F21K 9/66; F21K 9/69; F21V 3/02; F21V 3/049; F21V 7/005; G02B 6/001; F21Y 2101/00; F21Y 2115/10
See application file for complete search history.

(56) References Cited

U.S. PATENT DOCUMENTS

| | | |
|---|---|---|
| 2,710,274 A | 3/1952 | Kuehl |
| 4,422,719 A | 12/1983 | Orcutt |
| | (Continued) | |

FOREIGN PATENT DOCUMENTS

WO    2009/0004597 A2    1/2009

*Primary Examiner* — Evan P Dzierzynski
(74) *Attorney, Agent, or Firm* — ARENTFOX SCHIFF LLP

(57) ABSTRACT

Side light LED troffer tube. In an aspect, a side light LED tube is provided that includes a tube having at least one light receiving portion configured to receive light and gradient optics formed on the tube. The gradient optics providing a transparency gradient configured to distribute the light to achieve a selected emitted light intensity variation across a selected surface of the tube.

14 Claims, 6 Drawing Sheets

Related U.S. Application Data continuation of application No. 16/436,237, filed on Jun. 10, 2019, now Pat. No. 10,711,960, which is a continuation of application No. 15/601,829, filed on May 22, 2017, now Pat. No. 10,317,027, which is a continuation of application No. 13/086,235, filed on Apr. 13, 2011, now Pat. No. 9,657,907.

(60) Provisional application No. 61/423,018, filed on Dec. 14, 2010.

(56) References Cited

U.S. PATENT DOCUMENTS

| | | | |
|---|---|---|---|
| 4,805,984 A | 2/1989 | Cobb, Jr. | |
| 5,243,506 A | 9/1993 | Whitehead | |
| 5,499,112 A | 3/1996 | Kawai et al. | |
| 5,808,414 A | 9/1998 | Wharmby et al. | |
| 6,031,958 A | 2/2000 | McGaffin | |
| 6,164,791 A | 12/2000 | Gwo-Juh et al. | |
| 6,268,600 B1 | 7/2001 | Nakamura et al. | |
| 6,601,984 B2 | 8/2003 | Yamamoto | |
| 6,621,973 B1 * | 9/2003 | Hoffman | G02B 6/0096 |
| | | | 385/125 |
| 6,762,562 B2 | 7/2004 | Leong | |
| 7,114,834 B2 | 10/2006 | Rivas et al. | |
| 7,565,050 B2 | 7/2009 | Lee et al. | |
| 7,658,514 B2 * | 2/2010 | Lee | G02B 6/0096 |
| | | | 362/555 |
| 7,997,770 B1 | 8/2011 | Meurer | |
| 8,319,437 B2 | 11/2012 | Carlin et al. | |
| 8,358,266 B2 | 1/2013 | Khazeni et al. | |
| 8,878,428 B2 | 11/2014 | Sasaki et al. | |
| 2002/0114168 A1 | 8/2002 | Pelka et al. | |
| 2002/0126503 A1 | 9/2002 | Reed | |
| 2002/0131275 A1 | 9/2002 | Yamamoto et al. | |
| 2004/0066659 A1 * | 4/2004 | Mezei | G02B 6/0021 |
| | | | 362/555 |
| 2004/0220001 A1 * | 11/2004 | Oister | A63B 37/0024 |
| | | | 473/588 |
| 2005/0189545 A1 * | 9/2005 | Tazawa | F21S 43/237 |
| | | | 257/79 |
| 2005/0237765 A1 | 10/2005 | Suehiro | |
| 2007/0248307 A1 * | 10/2007 | Page | G02B 6/0065 |
| | | | 65/392 |
| 2008/0055894 A1 | 3/2008 | Deng | |
| 2008/0198624 A1 * | 8/2008 | Lundin | G02B 6/001 |
| | | | 29/525.01 |
| 2009/0109373 A1 | 4/2009 | Taniguchi et al. | |
| 2009/0129115 A1 | 5/2009 | Fine et al. | |
| 2010/0033988 A1 | 2/2010 | Chiu et al. | |
| 2012/0170305 A1 | 7/2012 | Rudek et al. | |
| 2012/0200617 A1 | 8/2012 | Mammen et al. | |
| 2015/0292696 A1 | 10/2015 | Soofer | |

\* cited by examiner

SIDE LIGHT LED TROFFER TUBE

CROSS-REFERENCE TO RELATED APPLICATIONS

This application is a continuation of U.S. patent application Ser. No. 17/527,487, filed on Nov. 16, 2021, which is a continuation of U.S. patent application Ser. No. 17/194,067, filed on Mar. 5, 2021, now U.S. Pat. No. 11,204,141, which is a continuation of Ser. No. 16/926,296, filed Jul. 10, 2020, now U.S. Pat. No. 10,962,184, which is a continuation of Ser. No. 16/436,237, filed Jun. 10, 2019, now U.S. Pat. No. 10,711,960, which is a continuation of U.S. patent application Ser. No. 15/601,829, filed May 22, 2017, now U.S. Pat. No. 10,317,027, which is a continuation of U.S. patent application Ser. No. 13/086,235, filed Apr. 13, 2011, now U.S. Pat. No. 9,657,907, which claims priority to U.S. Provisional application No. 61/423,018, filed Dec. 14, 2010, the disclosures of each of which are hereby incorporated by reference in their entireties.

BACKGROUND

Field

The present application relates generally to light emitting diodes, and more particularly, to a side light LED troffer tube that provides selectable light distribution using LED light sources.

Background

A light emitting diode comprises a semiconductor material impregnated, or doped, with impurities. These impurities add "electrons" and "holes" to the semiconductor, which can move in the material relatively freely. Depending on the kind of impurity, a doped region of the semiconductor can have predominantly electrons or holes, and is referred to as an n-type or p-type semiconductor region, respectively.

In LED applications, an LED semiconductor chip includes an n-type semiconductor region and a p-type semiconductor region. A reverse electric field is created at the junction between the two regions, which causes the electrons and holes to move away from the junction to form an active region. When a forward voltage sufficient to overcome the reverse electric field is applied across the p-n junction, electrons and holes are forced into the active region and combine. When electrons combine with holes, they fall to lower energy levels and release energy in the form of light. The ability of LED semiconductors to emit light has allowed these semiconductors to be used in a variety of lighting devices. For example, LED semiconductors may be used in general lighting devices for interior or exterior applications.

A troffer is a light fixture resembling an inverted trough that is typically either recessed in, or suspended from, the ceiling. Troffers are typically designed to emit light using fluorescent lighting tubes. The fluorescent tubes emit light along the entire length of the troffer to produce a desirable light distribution pattern. Unfortunately, fluorescent lighting tubes may be unreliable, require a warm up period, and produce poor color quality and flicker that people may find undesirable. Thus, LEDs are attractive candidates for replacing fluorescent lighting tubes in troffers. For example, LEDs have no warm up time, are long lasting and power efficient, and do not flicker.

However, LEDs are considered to be a point light source in that the light is emitted from a relatively small region. Thus, utilizing LEDs in troffers present various design challenges since it is desirable to control the intensity of light emitted across the length of the troffer. For example, it may be desirable to have uniformly distributed light intensity across the length of the troffer. One technique for using LEDs to obtain uniformly distributed light intensity across the length of the troffer is to use a large number of LEDs that are distributed throughout the troffer. Unfortunately, this technique results in a complex troffer design and the cost of utilizing a large number of LEDs may be prohibitive.

Accordingly, what is needed is a simple and cost efficient way to use LED semiconductors in troffers and to control the intensity of light emitted from the troffer.

SUMMARY

In various aspects, a side light LED tube is provided that can be configured to control the intensity of light emitted across the surface of the tube. For example, the tube can be used in a troffer housing and configured to uniformly distribute light emitted from LED semiconductors mounted at the ends of the tube. In various implementations, the tube comprises gradient optics that are configurable to provide a transparency gradient that operates to control the intensity of light emitted across the surface of the tube. Thus, the gradient optics can be configured to produce uniform light intensity from the tube. In other implementations, the gradient optics can be configured to provide controllable distribution of emitted light intensity across the surface of the tube.

In one implementation, the tube also provides integrated power/thermal management module and is socket ready to fit into standard troffer sockets used in troffer housings. As a result, the side light LED tube can be easily installed in a troffer housing to provide configurable distribution of light intensity, such as uniform light intensity, from the troffer tube.

In an aspect, a side light LED tube is provided that comprises a tube having at least one light receiving portion configured to receive light and gradient optics formed on the tube. The gradient optics providing a transparency gradient configured to distribute the light to achieve a selected emitted light intensity variation across the surface of the tube.

It is understood that aspects of the present invention will become readily apparent to those skilled in the art from the following detailed description. As will be realized, the present invention includes other and different aspects and its several details are capable of modification in various other respects, all without departing from the spirit and scope of the present invention. Accordingly, the Drawings and Description are to be regarded as illustrative in nature and not as restrictive.

BRIEF DESCRIPTION OF THE DRAWINGS

The foregoing aspects described herein will become more readily apparent by reference to the following Description when taken in conjunction with the accompanying drawings wherein.

DESCRIPTION

Figure 1:
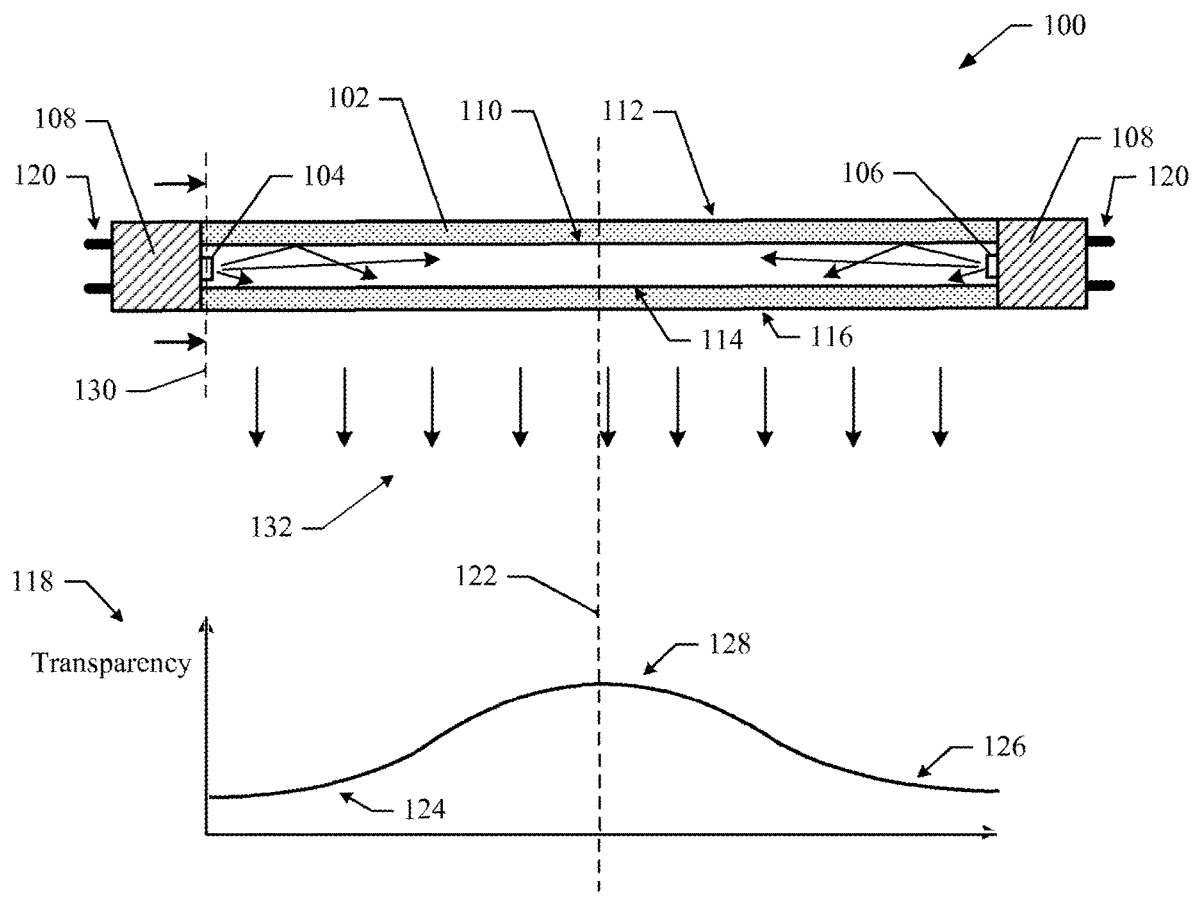
FIG. 1 shows an exemplary side light LED troffer tube that provides controllable distribution of emitted light intensity.

The present invention is described more fully hereinafter with reference to the accompanying drawings, in which various aspects of the present invention are shown. This invention may, however, be embodied in many different forms and should not be construed as limited to the various aspects of the present invention presented throughout this disclosure. Rather, these aspects are provided so that this disclosure will be thorough and complete, and will fully convey the scope of the present invention to those skilled in the art. The various aspects of the present invention illustrated in the drawings may not be drawn to scale. Accordingly, the dimensions of the various features may be expanded or reduced for clarity. In addition, some of the drawings may be simplified for clarity. Thus, the drawings may not depict all of the components of a given apparatus (e.g., device) or method.

Various aspects of the present invention will be described herein with reference to drawings that are schematic illustrations of idealized configurations of the present invention. As such, variations from the shapes of the illustrations as a result, for example, manufacturing techniques and/or tolerances, are to be expected. Thus, the various aspects of the present invention presented throughout this disclosure should not be construed as limited to the particular shapes of elements (e.g., regions, layers, sections, substrates, etc.) illustrated and described herein but are to include deviations in shapes that result, for example, from manufacturing. By way of example, an element illustrated or described as a rectangle may have rounded or curved features and/or a gradient concentration at its edges rather than a discrete change from one element to another. Thus, the elements illustrated in the drawings are schematic in nature and their shapes may not be intended to illustrate the precise shape of an element and are not intended to limit the scope of the present invention.

It will be understood that when an element such as a region, layer, section, substrate, or the like, is referred to as being "on" another element, it can be directly on the other element or intervening elements may also be present. In contrast, when an element is referred to as being "directly on" another element, there are no intervening elements present. It will be further understood that when an element is referred to as being "formed" on another element, it can be grown, deposited, etched, attached, connected, coupled, or otherwise prepared or fabricated on the other element or an intervening element.

Furthermore, relative terms, such as "lower" or "bottom" and "upper" or "top," may be used herein to describe one element's relationship to another element as illustrated in the drawings. It will be understood that relative terms are intended to encompass different orientations of an apparatus in addition to the orientation depicted in the Drawings. By way of example, if an apparatus in the Drawings is turned over, elements described as being on the "lower" side of other elements would then be oriented on the "upper" sides of the other elements. The term "lower", can therefore, encompass both an orientation of "lower" and "upper," depending of the particular orientation of the apparatus. Similarly, if an apparatus in the drawing is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items It will be understood that although the terms "first" and "second" may be used herein to describe various regions, layers and/or sections, these regions, layers and/or sections should not be limited by these terms. These terms are only used to distinguish one region, layer or section from another region, layer or section. Thus, a first region, layer or section discussed below could be termed a second region, layer or section, and similarly, a second region, layer or section may be termed a first region, layer or section without departing from the teachings of the present invention.

FIG. 1 shows an exemplary side light LED troffer tube 100 that provides controllable distribution of emitted light intensity. For example, the troffer tube 100 can be configured to provide uniform light intensity across the surface of the tube 100. The tube 100 comprises optics tube 102, end mounted LEDs 104 and 106, and integrated power/thermal management modules 108. It should be note that aspects of gradient optics described herein are suitable for use with virtually any type of lighting device and are not limited to only implementations of a troffer tube. Thus, the descriptions of the troffer tube herein provide exemplary implementations but are not intended to limit the various aspects to only those implementations.

The optics tube 102 comprises a tube having first and second ends. Each end is configured to have a light receiving portion that receives light to be emitted from the tube 102. In one implementation, the light receiving portion is configured to receive light from an LED light source.

The tube 102 comprises an upper portion with an interior surface 110 and an exterior surface 112. The tube 102 also comprises a lower portion with an interior surface 114 and an exterior surface 116. In various implementations, one or both of the surfaces 110, 112 of the upper portion are reflective so as to reflect light emitted from the LED light sources 104, 106 back into the tube 102. Furthermore, one or both of the surfaces 114, 116 of the lower portion comprise gradient optics that operate to control the intensity of light emitted from the tube 102. For example, light emitted from the LED sources 104, 106 strikes the reflective interior surface 110 and is reflected toward the gradient optics provided at the surface 114. The gradient optics provides a transparency gradient, shown generally at 118, to control the intensity of the light emitted from the tube 102. In one implementation, the gradient optics are configured to provide uniform light intensity from the tube 102, as indicated at 132. In other implementations, the gradient optics are configured to provide controllable emitted light intensity variations across the surface of the tube 102.

It should also be noted that although the optic tube 102 comprises a round shape; the optics tube 102 can be configured to have a shape selected from a set of shapes comprising circular, oval, elliptical, parabolic, and multi-sided shapes. Thus, it is possible for the optic tube 102 to have a cross section forming any type of shape and to have any desired length. For example, the length may be selected to provide a troffer tube that is compatible (i.e., replaceable) with standard florescent tubes, such as standard T8 or T12 fluorescent tubes.

An integrated power/thermal management module 108 is coupled at each end of the tube 102 and is designed to provide power and thermal management to the LED light sources 104, 106. To facilitate installation in a troffer housing, the integrated power/thermal management modules 108 comprise connectors 120 that includes electrical contacts designed to mate with conventional troffer sockets. For example, the connector 120 is configured to connect to standard troffer sockets typically used for fluorescent lighting tubes. The connector 120 can be orientated in any fashion so that when the tube 102 is installed and connected in a troffer housing, the surfaces 110 and 112 are above the surfaces 114 and 116 so that emitted light is directed and distributed downward. However, in other implementations, the connector 120 can be orientated in any position relative to the surfaces 110, 112 and 114, 116.

Thus, the overall length of the LED troffer tube 100 is configured so that it can be an equivalent or replacement for standard fluorescent light tubes. It should be noted that in various implementations, the LED troffer tube 100 may be configured to have any desired dimension, shape, and/or length.

The gradient optics is provided at one or both of the surfaces 114 and 116. In various implementations, the gradient optics operates to control the intensity of light emitted across the surface of the tube 102. For example, in one implementation, the gradient optics provides a transparency gradient that results in less transparency towards the ends of the optics tube 102 and more transparency toward the centerline 122 of the optics tube 102, resulting in even distribution of emitted light intensity across the surface of the tube 102.

Transparency graph 118 illustrates how the gradient optics at the surfaces 114, 116 of the optics tube 102 are designed to provide the transparency gradient. For example, at regions 124 and 126 located near the ends of the optics tube 102, the transparency of the optics tube 102 is reduced. At region 128, near the center of the optics tube 102, the transparency is increased. Thus, the gradient optics are configured to allow more light to pass through the center of the optics tube 102 than at its ends to provide for uniform emitted light intensity across the surface of the optics tube 102.

To further illustrate the operation of the troffer tube 100 to provide configurable light intensity along its length, a cross section indicator 130 indicates a cross sectional of the tube 100 that is discussed in further detail below. It should be noted that although the gradient optics can be configured in a variety of ways to control the emitted light intensity from the tube 100; for the purpose of this description, the gradient optics have been configured to provide uniform light intensity across the surface of the tube 100. However, in other implementations, the gradient optics can be configured to provide any desirable light intensity distribution pattern.

Figure 2:
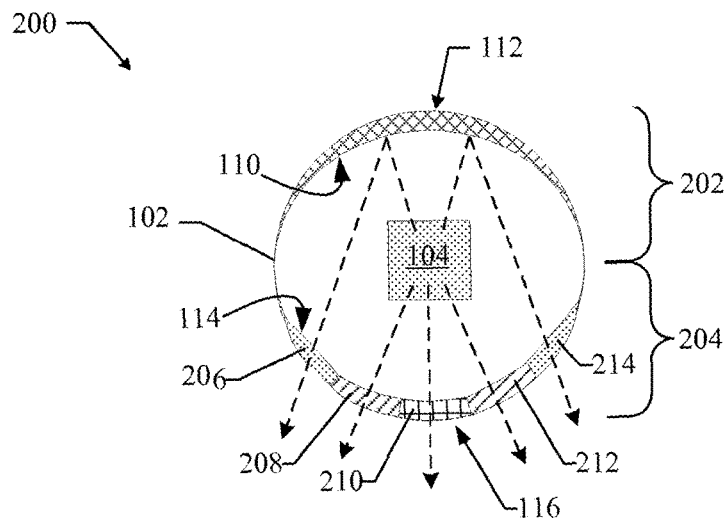
FIG. 2 shows a cross-sectional view of the side light LED troffer tube of FIG. 1.

FIG. 2 shows a cross-sectional view 200 of the side light LED troffer tube 100 shown of FIG. 1. For example, the view 200 is taken at cross section indicator 130. The optics tube 102 comprises an upper portion 202 and a lower portion 204. The upper portion 202 comprises the interior surface 110 and exterior surface 112. The lower portion 204 comprises the interior surface 114 and exterior surface 116. In various implementations, gradient optics are formed or disposed on one or both of the interior surface 114 and exterior surface 116. For example, gradient optics provided lengthwise along the tube 102 are shown in the cross-sectional view 200 as the regions 206, 208, 210, 212, and 214. Light emitted from the LED source 104 reflects off the reflective surface 110 and passes through the gradient optics disposed at the surface 114. As a result, the intensity of light emitted across the surface of the tube 100 can be controlled.

In one embodiment, the optics tube 102 is made from glass, acrylic or plastic material and the gradient optics disposed on the surface 114 and/or 116 can be formed in any of several ways to provide a desired transparency gradient. For example, the transparency gradient provided by the gradient optics formed on the surface 114 and/or 116 may be obtained using material thickness variation, material variation, thin film applications, material density variations, material layering, surface texturing and/or surface defects. Furthermore, the optics tube 102 may comprise any desired cross sectional shape to facilitate the desired light distribution pattern.

Figure 3:
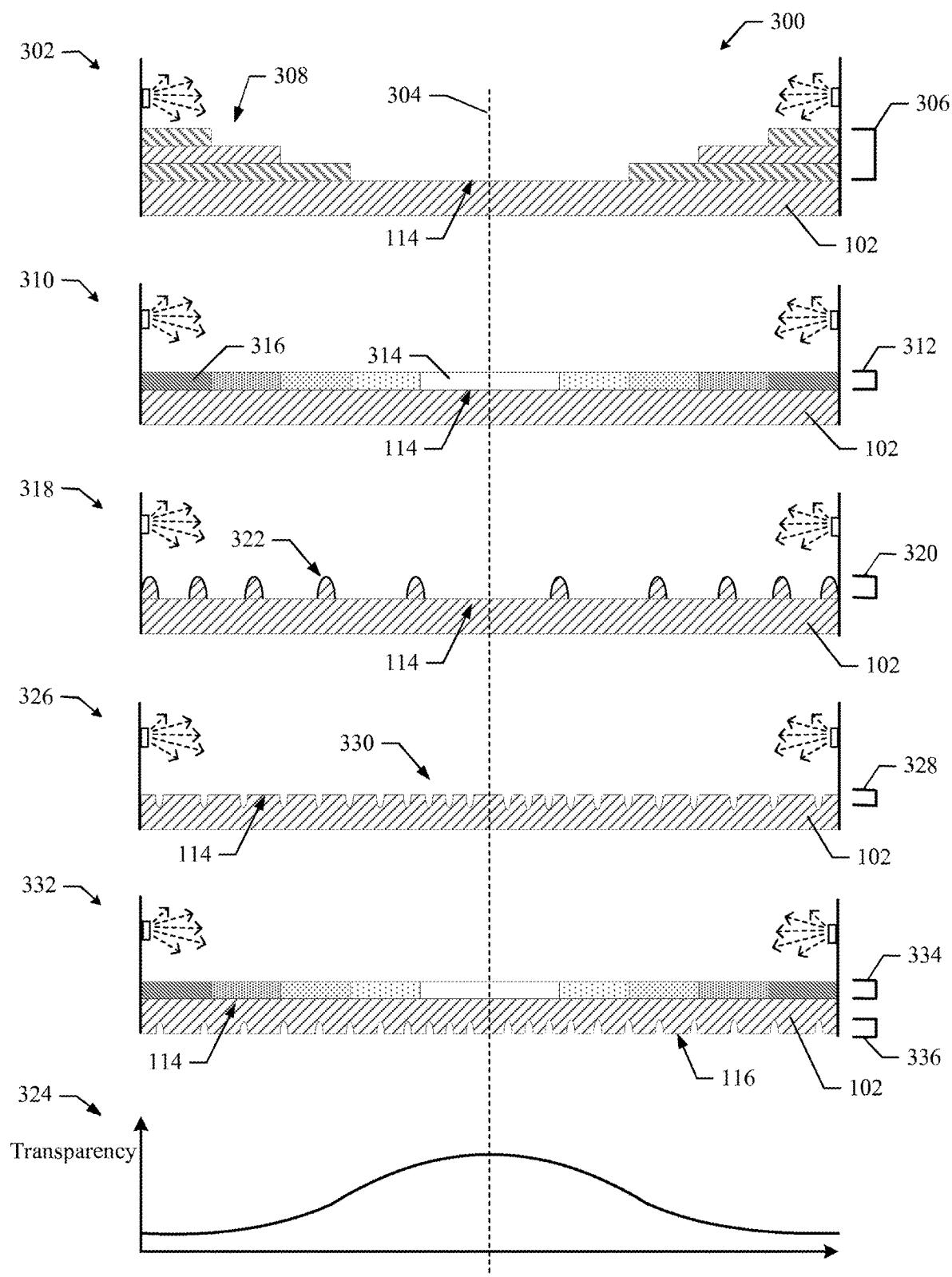
FIG. 3 shows exemplary implementations of a gradient optics surface suitable for use with the side light LED troffer tube.

FIG. 3 shows exemplary implementations 300 of gradient optics formed or disposed on the surface 114 and/or the surface 116 of the optics tube 102. For example, in any of the exemplary implementations 300 the gradient optics may be provided on one or both surfaces as discussed below.

In a first exemplary implementation 302, the gradient optics 306 are formed on the interior surface 114 of the optics tube 102. The gradient optics 306 comprise sections of material having varying material thicknesses (indicated at 308) to produce the transparency gradient. For example, the gradient optics 306 comprises one or more sections of material to provide more thickness at the ends of the optics tube 102 than in the center region. Thus, the thickness of the material provides gradient optics 306 having decreased transparency with increasing distance from the center line 304. The increasing material thickness provides the transparency gradient illustrated at 324.

It should be noted that although shown as increasing material thickness, the gradient optics 306 may comprise material of varying densities which do not change the overall material thickness but accomplish the same transparency result. In another implementation, material variations are used to provide the transparency gradient. The material variations comprise different types of material that are layered as illustrated at 308 to provide the desired transparency gradient. Thus, the gradient optics 306 can be provided by any combination of material thickness, material variation, material layering, and/or material density.

In a second exemplary implementation 310, the gradient optics 312 are formed on the interior surface 114 of the optics tube 102. The gradient optics 312 comprise a surface coating that provides the transparency gradient illustrated at 324. The surface coating may be formed using a variety of techniques. For example, the surface coating may be a diffuser film applied to the tube or a polymer material that is painted onto the tube. The surface coating is designed to provide more transparency near the center line 304, as illustrated by the light region 314, and less transparency as the distance from the center line increases, as illustrated by the dark region 316. The different transparency regions of the surface coating provide the transparency gradient illustrated at 324. In another implementation, the gradient optics 312 comprises sections of different materials, where each material provides a different transparency to achieve the transparency gradient 324.

In a third exemplary implementation 318, the gradient optics 320 are formed on the interior surface 114 of the optics tube 102. The gradient optics 320 comprise surface texturing that provides one or more surface features 322. The surface features 322 may be ridges, bumps or other surface features that are arranges in any desired pattern and/or spacing to provide the transparency gradient illustrated at 324. For example, in one implementation, the surface features 322 comprise ribs that are gradually less concentrated near the center line 304 to provide for decreased transparency as the distance from the center line 304 increases.

In a fourth exemplary implementation 326, the gradient optics 328 are formed on the interior surface 114 of the optics tube 102. The gradient optics 328 comprise surface texturing that provides one or more surface defects, as illustrated at 330. The surface defects 330 comprise scratched or sanded regions or other defects in the interior surface 114 which affect light distribution. The surface defects are arranged in any desired pattern and/or spacing to provide the transparency gradient illustrated at 324. For example, more surface defects are provided near the center line 304 to increase transparency. Less surface defects are provided as the distance from the center line 304 increases to decrease transparency.

In a fifth exemplary implementation 332, the gradient optics 334 and 336 are formed on the interior surface 114 and the exterior surface 116 of the optics tube 102. The gradient optics 334 comprise a surface coating that provides the transparency gradient illustrated at 324. The surface coating may be formed using a variety of techniques. For example, the surface coating may be a diffuser film applied to the acrylic or a polymer material that is painted onto the acrylic. The surface coating is designed to provide more transparency near the center line 304 and less transparency as the distance from the center line increases.

The gradient optics 336 comprise surface texturing that provides one or more surface defects. The surface defects comprise scratched or sanded regions or other defects in the exterior surface 116 which affect light distribution. The surface defects are arranged in any desired pattern and/or spacing to provide the transparency gradient illustrated at 324. For example, more surface defects are provided near the center line 304 to increase transparency. Less surface defects are provided as the distance from the center line 304 increases to decrease transparency. Thus, the fifth implementation 332 illustrates how gradient optics can be formed on both the interior surface 114 and the exterior surface 116 to provide the transparency gradient illustrated at 324.

It should be noted that although five exemplary implementations of gradient optics are shown, other implementations of gradient optics may be formed on the optic tube 102 to provide the transparency gradient 324. Furthermore, implementations of the gradient optics can be configured to provide transparency gradients that are different from the transparency gradient 324. For example, the gradient optics can be configured to provide any desirable transparency gradient to control the light intensity emitted along the length of the tube 100. Thus, the gradient optics may be formed individually or formed in any combination on the interior and/or exterior surface of the optic tube to produce the transparency gradient 324 or other desired transparency gradients.

Gradient Optics Performance

In various implementations, the gradient optics provides a transparency gradient that operates to control the light intensity emitted from the LED troffer tube. For example, the transparency gradient can be configured to provide uniformly distributed light intensity emitted from the LED troffer tube. The gradient optics may be formed and/or disposed on the troffer tube using one or more of the implementations discussed with respect to FIG. 3 to achieve a light output having a desired light intensity distribution.

Thus, in one implementation of the gradient optics, the variation in light intensity emitted from the optics tube is configured to vary by substantially 100 percent. In this implementation, the gradient optics are configured to provide at least one surface region where substantially no light is emitted from the optics tube, and at least one other surface region where a maximum amount of light is emitted from the optics tube. This configuration results in substantially a 100 percent variation in the intensity of emitted light.

In other implementations of the gradient optics, the variation in light intensity emitted from the optics tube is configured to vary by any amount less than 100 percent. For example, the gradient optics can be configured to provide any desired variation in light intensities across the surface regions of the optics tube to achieve a desired emission or corresponding illumination pattern.

Figure 4:
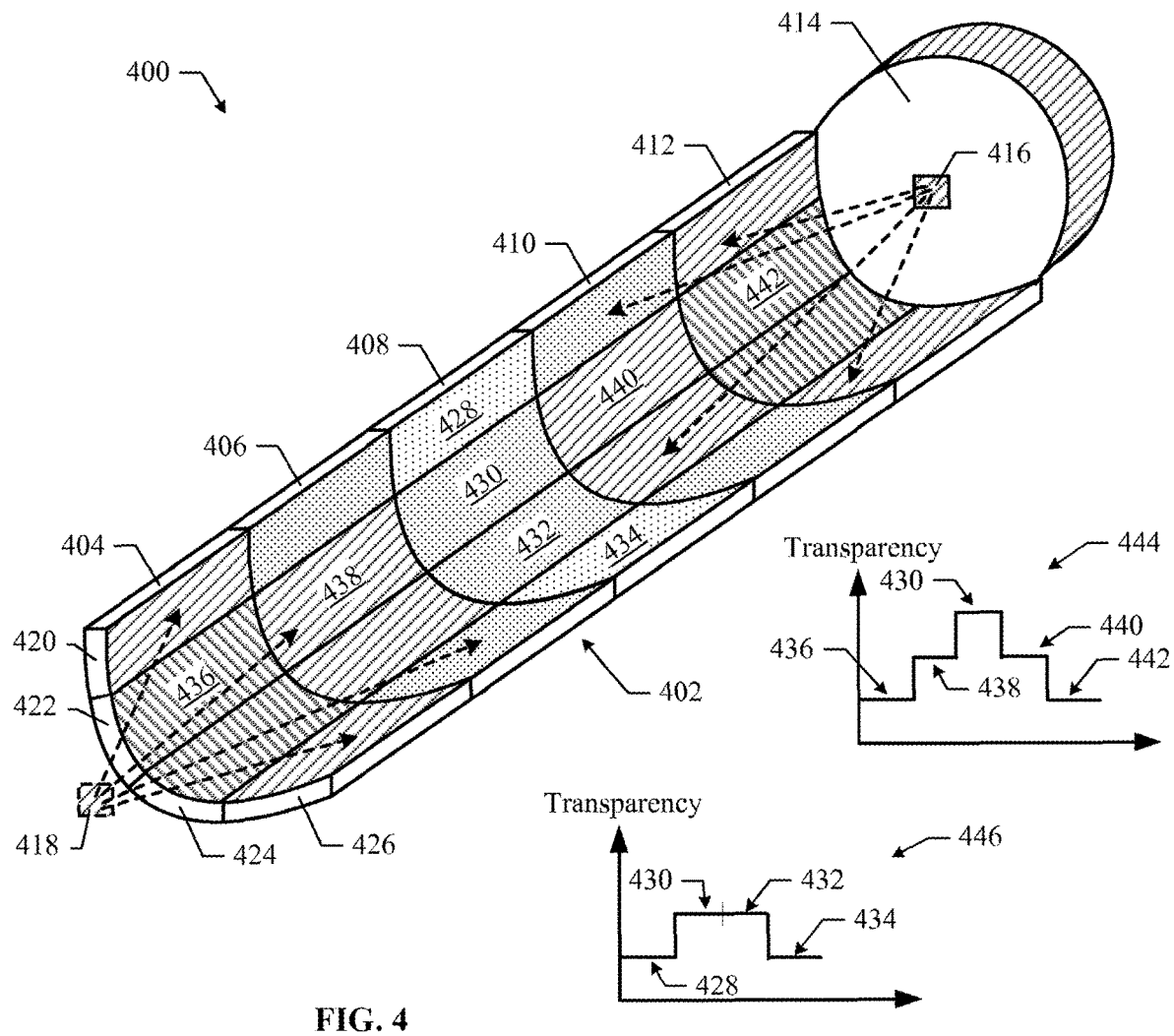
FIG. 4 illustrates an exemplary implementation of a troffer tube.

FIG. 4 illustrates an exemplary implementation of a tube 400 comprising gradient optics. The tube 400 comprises a lower tube portion 402 coupled to an integrated power and thermal management module 414.

The integrated power and thermal management module 414 comprises an LED 416 that emits light along the length of the tube 400 as indicated by the dashed lines. The module 414 provides power to the LED 416 and regulates the dissipation of heat generated by the LED 416. Also illustrated is LED 418, which emits light along the length of the troffer 400 from the end opposite of the LED 416, as indicated by the dashed lines. For clarity, a corresponding integrated power and thermal management module associated with the LED 418 is not shown.

The lower tube portion 402 comprises gradient optics formed on an interior surface. In this example, the gradient optics are formed using a thin film application onto the interior surface. For example, the thin film application provides multiple gradient optic surface regions and each region provides a selected transparency. The tube 402 is divided into crosswise sections that extend across the tube 102, as illustrated at 404, 406, 408, 410, and 412. The tube 402 is also divided into lengthwise sections that extend along the length of the tube, as illustrated at 420, 422, 424, and 426. The crosswise and lengthwise sections define surfaces of the tube 402 having gradient optics that provide selected transparency gradients. For example, crosswise surface regions include 428, 430, 432 and 434 and lengthwise surface regions include 436, 438, 430, 440, and 442. Each of the crosswise and lengthwise surface regions are configured with gradient optics to provide a corresponding transparency gradient that allows light emitted from the LEDs 416 and 418 to pass through the lower tube portion 402 with a selected intensity characteristic.

The transparency graph 444, illustrates the transparency provided by the gradient optics at the surfaces of the lengthwise section 422. For example, the surface regions 436 and 442 provide the least transparency, the surface regions 438 and 440 provide additional transparency and the surface region 430 provides the most transparency. The gradient optics provided at the regions 436, 438, 430, 440 and 442 operate to control the intensity variation of light emitted across the identified surfaces of the tube 402.

The transparency graph 446, illustrates the transparency provided by the gradient optics at the surfaces of the crosswise section 408. For example, the surface regions 428 and 434 provide the least transparency and the surface regions 430 and 432 provide additional transparency. The gradient optics provided by the surface regions 428, 430, 432, and 434 operates to control the intensity variation of light emitted across the identified surfaces of the tube 402.

It should be noted that gradient optics can be provided on any number of surface regions to create any desired transparency characteristics across the surface of the tube. Thus, the tube 402 is configured with crosswise and lengthwise surfaces having respective gradient optics formed on one or both of the interior and exterior surfaces of the tube. The gradient optics provide a transparency gradient provided at each surface region is configured to distribute light to achieve a selected emitted light intensity variation across the surface of the tube.

Figure 5:
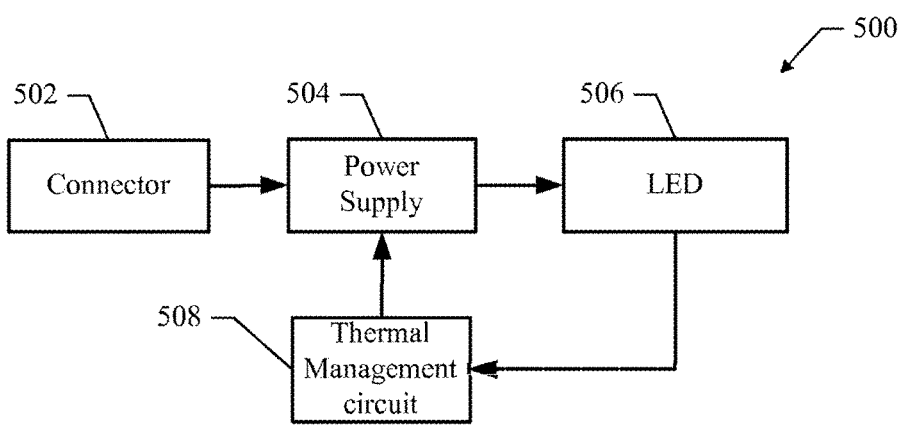
FIG. 5 shows an exemplary integrated power and thermal management module.

FIG. 5 shows an exemplary integrated power and thermal management module 500. For example, the module 500 is suitable for use as the module 108 shown in FIG. 1. The module 500 comprises a connector 502, power supply 504, LED 506, and thermal management circuit 508.

The connector 502 is configured to provide a mechanical and electrical coupling to a socket in a troffer housing. For example, the connector 502 is configured to connect to a standard fluorescent light tube connector in a troffer housing and carry electric signals comprising power and/or control signals to the power supply 504.

The power supply 504 is configured to receive the input electrical signals and generate a power signal to the LED 506. The power supply 504 may convert, amplify, attenuate or perform other functions to the input electrical signals to produce the power signal that is provided to the LED 506.

The LED 506 comprises any suitable LED for use in a troffer tube. The thermal management circuit 508 operates to receive thermal indicators associated with the operation of the LED 506 and provide control signals to the power supply 504 to adjust the power signal provided to the LED 506. The thermal management circuit 506 may also provide a heat sink to allow dissipation of heat from the LED 506. Thus, the thermal management circuit 508 operates to receive a thermal feedback indicator and adjust and manage the power supply 504 to control the temperature of the LED 506.

It should be noted that the integrated power and thermal management module 500 illustrates just one implementation and that other implementations that combine or redistribute the described functions are possible.

Figure 6:
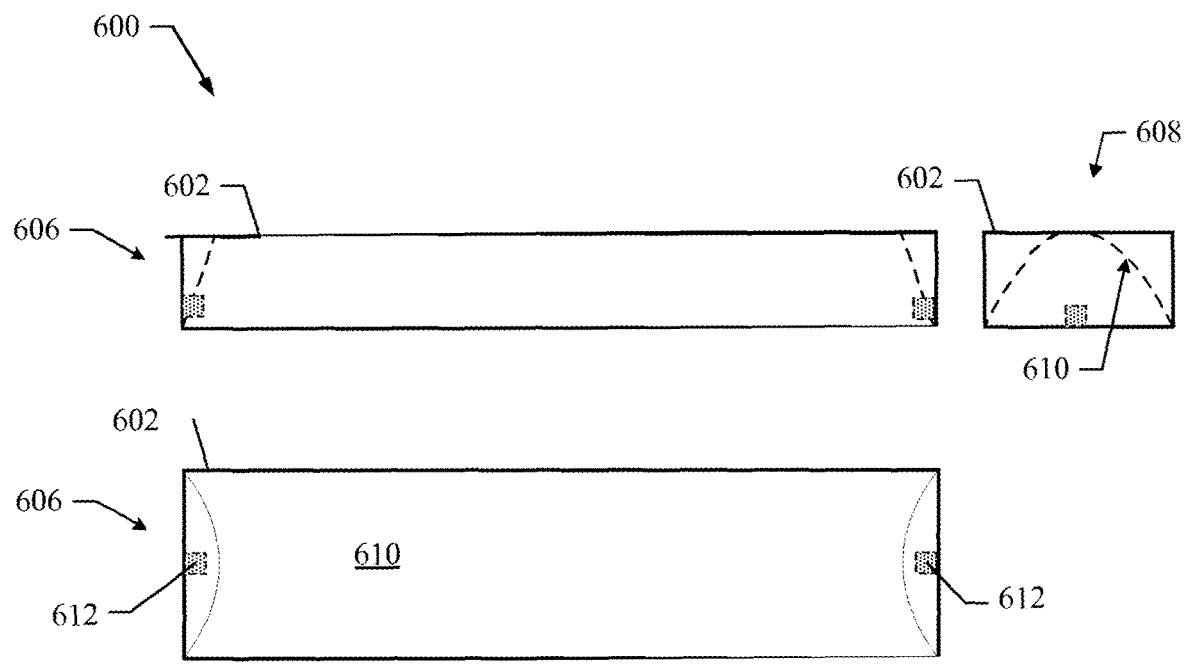
FIG. 6 shows an exemplary troffer housing suitable for use with a side light LED troffer tube.

FIG. 6 shows an exemplary troffer housing 600 suitable for use with the side light LED troffer tube 100 shown in FIG. 1. The troffer housing 600 comprises a housing 602 that is illustrated in side 604, bottom 606 and end 608 views. For example, the housing may be a 2'×6' housing typically used for fluorescent lighting.

Referring to the bottom view 606, the housing 602 comprises an internal reflective surface 610 which is designed to reflected light to the bottom portion of the housing. Referring to the end view 608, the reflective surface 610 is more clearly shown.

The housing 602 comprises two sockets 612 mounted therein. The sockets 612 are spaced apart from each other and configured to mate with the connectors 120 of the side light LED troffer tube 100. Thus, the side light LED troffer tube can be mechanically and electrically coupled to the apparatus 600 to produce evenly distributed light from end mounted LEDs.

Figure 7:
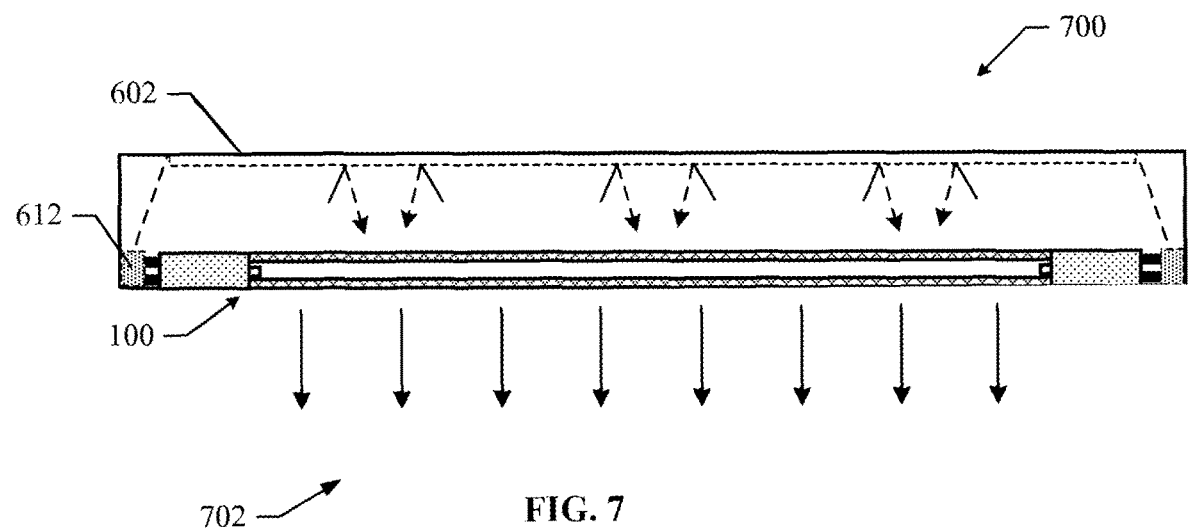
FIG. 7 shows an exemplary assembly comprising the housing of FIG. 6 and the side light troffer tube of FIG. 1.

FIG. 7 shows an exemplary troffer assembly 700 comprising the troffer housing 600 of FIG. 6 and the side light LED troffer tube 100 of FIG. 1. For example, the troffer assembly 700 is suitable for use as an internal lighting device, such as a ceiling light. In the troffer assembly 700, the side light LED troffer tube 100 is coupled to the connectors 612 at the bottom portion of the housing 602. It should be noted that the side light LED troffer tube 100 provides a transparency gradient configured to provide for even light distribution.

During operation, light is emitted from the side light LED troffer tube 100 in an intensity distribution pattern as indicated at 702. For example, light is emitted from the end mounted LEDs within the troffer tube and passes through a transparency gradient provided by the gradient optics of the troffer tube to result in the intensity distribution having substantially no intensity variation, as illustrated at 702. Thus, the troffer assembly 700 operates to provide evenly distributed light from a side light LED troffer tube having an associated transparency gradient.

Figure 8:
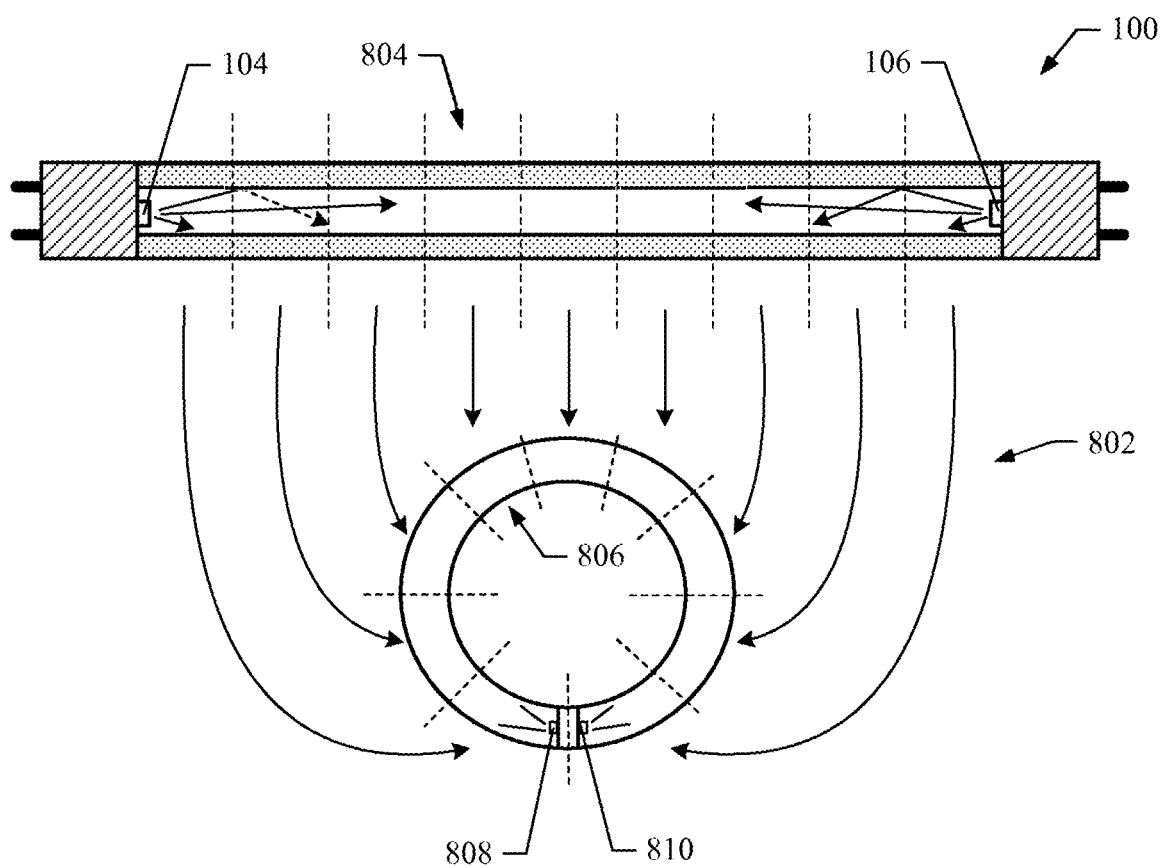
FIG. 8 illustrates how an exemplary side light troffer tube can be configured in a non-linear configuration.

FIG. 8 illustrates how a linear side light LED troffer tube can be configured in a non-linear configuration. For example, it is possible to reconfigure the side light LED troffer tube 100 into the non-linear tube 802. For example, sections of the linear tube 100 are shown in their new location at the non-linear tube 802. For instance, the section 804 is relocated to section 806 of the non-linear tube 802. The LEDs 104 and 106 are relocated to the LEDs 808 and 810. In the non-linear configuration 802, the LEDs 808 and 810 are positioned back-to-back and emit light into the tube 802 in different directions.

Thus, it is possible to produce various non-linear implementations of the linear side light LED troffer tube 100. Because FIG. 8 shows a top view of the non-linear tube 802, the transparency gradient is facing down or into the page. Additional description of the non-linear tube 802 and associated transparency gradient is provided below.

Figure 9:
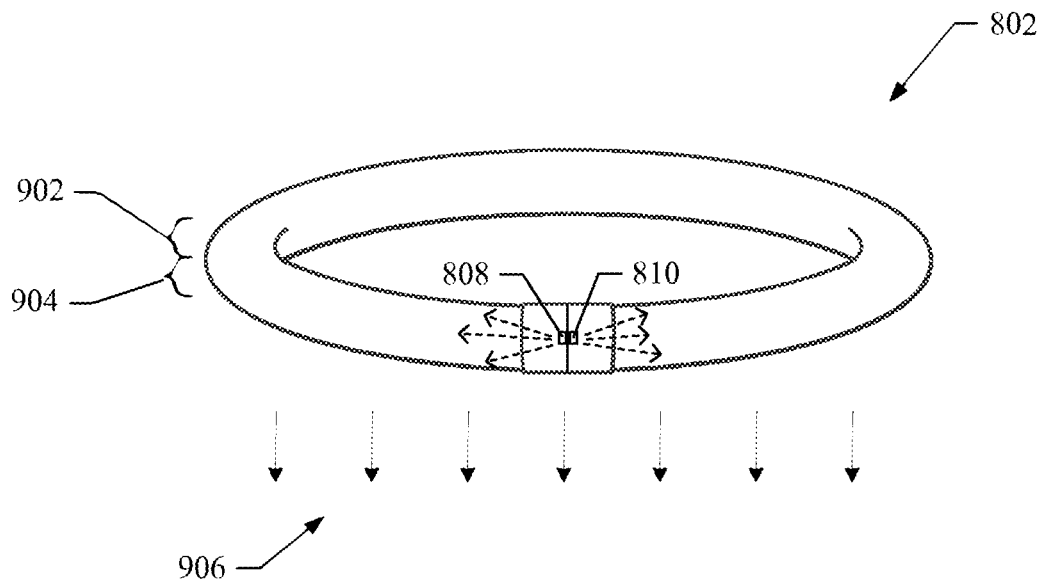
FIG. 9 shows an exemplary perspective view of a non-linear troffer tube.

FIG. 9 shows an exemplary perspective view of the non-linear tube 802. As discussed above, the non-linear tube 802 comprises LEDs 808 and 810 mounted back-to-back and emitting light into the tube 802 in different directions. In various implementations, the LEDs 808 and 810 may be powered through electrical connections (not shown) or inductively.

The non-linear tube 802 comprises a top portion 902 and a bottom portion 904. The top portion 902 includes a reflective interior surface configured to reflect light back toward the bottom portion 904. The bottom portion 904 includes gradient optics (internally, externally or both) that provide a transparency gradient as discussed above. The transparency gradient operates to control how the intensity of the light emitted from the LEDs 808 and 810 is distributed. In one implementation, the transparency gradient operates to provide evenly distributed light intensity, as indicated at 906. Although the tube 802 is configured in a circular configuration, other non-linear configurations are possible.

Figure 10:
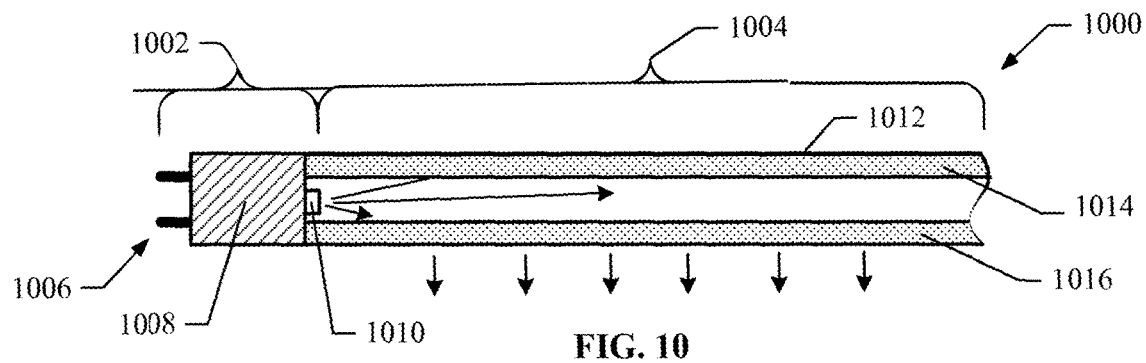
FIG. 10 shows an exemplary side light assembly.

FIG. 10 shows an exemplary side light assembly 1000. The side light assembly 1000 comprises an emitter portion 1002 and a gradient optics portion 1004. The emitter portion 1002 comprises electrical connector 1006, power and thermal management module 1008, and LED 1010. The gradient optics portion 1004 comprises a tube 1012 having an upper portion with a reflective surface 1014 and a lower portion with gradient optics 1016. The gradient optics 1016 are designed to provide a transparency gradient to control how the distribution of light intensity emitted from the tube. It should be noted that the tube 1012 may have any cross-sectional shape, such as circular, parabolic, elliptical, triangular, or other multisided shape.

In various implementations, the assembly 1000 can be arranged and configured to provide a variety of lighting devices. For example, the assembly 1000 can be curved into various shapes and include multiple emitter portions 1002 or a reflective end cap. In other implementations, two or more of the assemblies 1000 can be combined to form more complex lighting devices. Several exemplary lighting devices that can be formed from the assembly 1000 are discussed below.

Figure 11:
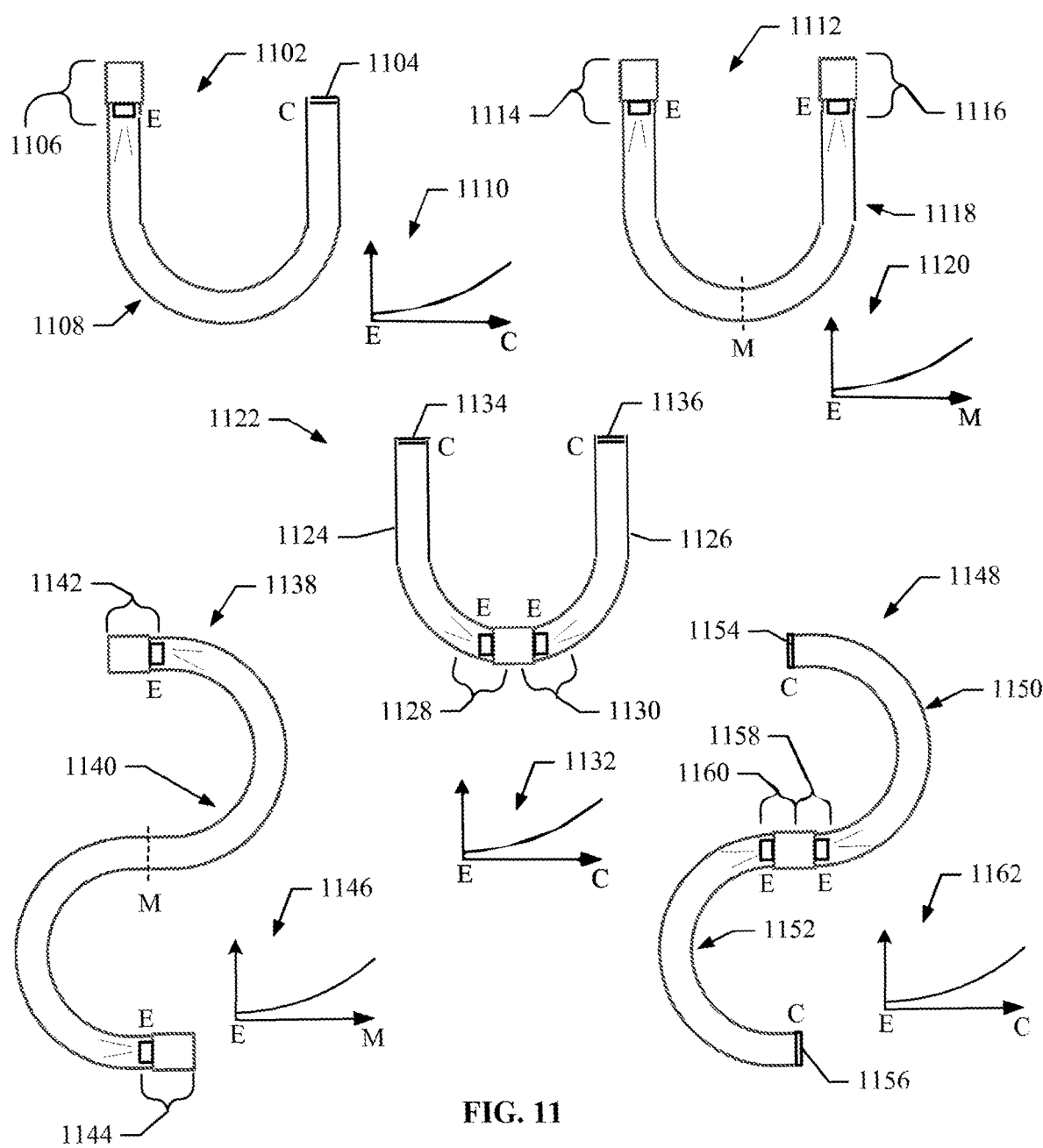
FIG. 11 shows top views of exemplary lighting devices formed from the side light assembly shown in FIG. 10.

FIG. 11 shows top views of exemplary lighting devices formed from the side light assembly 1000 shown in FIG. 10. For example, each of the lighting devices is formed from one or more configurations of the assembly 1000. Each device comprises gradient optics that provides a transparency gradient to distribute the light emitted from one or more LEDs to achieve a selected intensity variation along the length of the device. Since FIG. 11 shows top views, it will be assumed that the distributed light is being emitted into the page.

A first exemplary light device 1102 is formed by curving a selected length of the gradient portion 1004 of the assembly 1000 to form the gradient portion 1108 and adding a reflective end cap 1104. The reflective end cap 1104 comprises any suitable reflective material to reflect light back into the device 1102. An emitter portion 1106 emits light into the gradient portion 1108. The gradient portion 1108 comprises gradient optics that provides a transparency gradient to distribute the light to achieve a selected emitted light intensity variation across the surface of the device 1102. For example, the gradient portion 1108 provides the transparency gradient 1110. The transparency gradient 1110 indicates less transparency near the emitter 1106 (E) and greater transparency near the end cap (C).

A second light device 1112 is formed by curving a selected length of the gradient portion 1004 of the assembly 1000 to form the gradient portion 1118. Two emitter portions 1114 and 1116 emit light into the gradient portion 1118. The gradient portion 1118 comprises gradient optics that provides a transparency gradient to distribute the light to achieve a selected emitted light intensity variation across the surface of the device 1112. For example, the gradient portion 1118 provides the transparency gradient 1120. The transparency gradient 1120 indicates less transparency near the emitters (E) and greater transparency near the midpoint (M).

A third light device 1122 is formed by combining two of the assembly 1000 and curving their associated gradient portions 1004 to form two gradient portions 1124 and 1126 that include end caps 1134 and 1136. Two emitter portions 1128 and 1130 are provided to emit light into the gradient portions 1124 and 1126. The gradient portions 1124 and 1126 comprise gradient optics that provides a transparency gradient to distribute the light to achieve a selected emitted light intensity variation across the surface of the device 1122. For example, the gradient portions 1124 and 1126 provide the transparency gradient 1132. The transparency gradient 1132 indicates less transparency near the emitters (E) and greater transparency near the end caps (C).

A fourth light device 1138 is formed by curving a selected length of the gradient portion 1004 of the assembly 1000 to form a gradient portion 1140. Two emitter portions 1142 and 1144 emit light into the gradient portion 1140. The gradient portion 1140 comprises gradient optics that provides a transparency gradient to distribute the light to achieve a selected emitted light intensity variation across the surface of the device 1138. For example, the gradient portion 1140 provides the transparency gradient 1146. The transparency gradient 1146 indicates less transparency near the emitters (E) and greater transparency near the mid point (M).

A fifth light device 1148 is formed by combining two of the assembly 1000 and curving their associated gradient portions 1004 to form two gradient portions 1150 and 1152 that include end caps 1154 and 1156. Two emitter portions 1158 and 1160 are provided to emit light into the gradient portions 1150 and 1152. The gradient portions 1150 and 1152 comprise gradient optics that provides a transparency gradient to distribute the light to achieve a selected emitted light intensity variation across the surface of the device 1148. For example, the gradient portions 1150 and 1152 provide the transparency gradient 1162. The transparency gradient 1162 indicates less transparency near the emitters (E) and greater transparency near the end caps (C).

It should be noted that although the various aspects have been described herein with respect to a troffer tube, they are equally applicable to other types of lighting devices. For example, other types of lighting devices, such as light bulbs, luminares, automotive lighting, interior and exterior lighting can be configured with gradient optics to provide controllable emitted light intensity variation across the surface of the particular lighting device. Thus, the gradient optics can be incorporated into virtually any type of lighting device to achieve a desired light emission and/or illumination pattern.

The various aspects of this disclosure are provided to enable one of ordinary skill in the art to practice the present invention. Various modifications to aspects presented throughout this disclosure will be readily apparent to those skilled in the art, and the concepts disclosed herein may be extended to other applications. Thus, the claims are not intended to be limited to the various aspects of this disclosure, but are to be accorded the full scope consistent with the language of the claims. All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Accordingly, while aspects of a side light LED tube with associated transparency gradient have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A light emitting diode ("LED") apparatus comprising:
an elongated housing;
a light emitting source disposed at a first end of the elongated housing;
a reflector disposed in the elongated housing and extending from the first end of the elongated housing towards a second end of the housing; and
a gradient optics coupled to the reflector and comprising a varying transparency that progressively increases as the gradient optics extends from the first end of the elongated housing towards the second end so that light emitted from the light emitting source appears to be substantially uniform when the light reflects off the reflector, wherein the gradient optics are disposed on both an interior surface of the elongated housing and an exterior surface of the elongated housing.

2. The LED apparatus according to claim 1, wherein the gradient optics comprises a plurality of gradient optic regions having varying transparencies.

3. The LED apparatus according to claim 2, wherein the gradient optics comprises at least one surface onto which the plurality of gradient optic regions are formed.

4. The LED apparatus according to claim 3, wherein the at least one surface comprises an interior surface and an exterior surface and the plurality of gradient optic regions are formed on at least one of the interior surface and the exterior surface.

5. The LED apparatus according to claim 1, wherein the reflector comprises at least one reflective surface that reflects light toward the gradient optics.

6. The LED apparatus according to claim 1, wherein the housing comprises at least one cross-sectional shape selected from one of a circular shape, oval chape, elliptical shape, parabolic shape, tubular shape, or multisided shape.

7. The LED apparatus according to claim 1, wherein the elongated housing comprises a troffer tube housing.

8. The LED apparatus according to claim 1, further comprising:
an integrated power and thermal management circuitry coupled to the light emitting source and comprising a connector configured to mate with a troffer socket.

9. The LED apparatus according to claim 1, further comprising:
an integrated power and thermal management circuitry coupled to the one light emitting source.

10. The LED apparatus according to claim 9, wherein the integrated power and thermal management circuitry comprise a connector configured to mate with a troffer socket.

11. The LED apparatus according to claim 1, wherein the elongated housing is configured to have a selected length such that it is equivalent to one of a T8 or T12 fluorescent tube.

12. The LED apparatus according to claim 1, wherein the elongated housing comprises a non-linear shape.

13. The LED apparatus according to claim 1, wherein the gradient optics includes varying diffuser films along the elongated housing to provide the increasing transparency.

14. The LED apparatus according to claim 1, wherein the gradient optics on the exterior surface comprise scratched or sanded regions to affect light distribution.

* * * * *